2,953,446

SOLID COMPOSITE PROPELLANTS PREPARED FROM DEPOLYMERIZED RUBBER

Thomas Joseph Engelbach, Middletown, N.J., assignor to Borne Chemical Company, Inc., Elizabeth, N.J., a corporation of New Jersey No Drawing. Filed Dec. 8, 1958, Ser. No. 778,564

19 Claims. (Cl. 52—.5)

This invention relates to rubber compositions and processes for reducing them.

Solid fuels are utilized widely for the propulsion of the modern rocket motor. Such solid fuels comprise a highly reactive solid oxidizing agent dispersed in a solid combustible binder. The unstable characteristics of the oxidizing agent render especially precarious the production of solid fuels by methods involving high temperatures.

In accordance with this invention, solid fuels are produced at room or lower temperature, thereby avoiding the dangers inherent in the manufacture of solid fuels by methods involving high temperatures. The solid fuels of this invention comprise cured depolymerized rubber and an alkali metal or ammonium perchlorate or nitrate. The alkali metal or ammonium perchlorate or nitrate may be 2 to 8 times that of the cured depolymerized rubber in the solid fuel.

The solid fuels of this invention are produced by first forming an admixture comprising depolymerized rubber, a primary accelerator, a secondary accelerator and the alkali metal or ammonium perchlorate or nitrate. The admixture also includes zinc oxide which acts as an activator and elemental sulphur which functions as a linking agent, furnishing a type of cross linkages between the molecules making up the depolymerized rubber. The zinc oxide and elemental sulphur are added to, and well distributed in, the depolymerized rubber, after which the primary accelerator and a secondary accelerator are successively added. The alkali metal or ammonium perchlorate or nitrate is then mixed with the liquid mass. The resulting liquid admixture may be poured into a rocket motor or an appropriate mold adapted for insertion into a rocket motor and permitted to cure to a solid mass at substantially room temperature (60 to 100° F.) or lower. The time of cure may very from several hours to a few days and preferably in less than 24 hours. The entire operation may vary from several hours to a few days. The entire operation may be conducted at substantially room temperature or at a lower temperature prior to cure, at which the depolymerized rubber remains sufficiently liquid to incorporate the other components of the admixture.

The depolymerized rubber employed in the production of the compositions of this invention has a viscosity of 20,000 to 150,000 centipoises at 150° F. It may be produced by heating crude, vulcanized or reclaimed rubber at a temperature of 270° F. to 300° F. for a period of two to four hours until such rubber possesses the viscosity here specified.

The primary accelerator comprises a zinc salt of a dialkylated dithiocarbamic acid, the zinc salt of xanthic acid or a zinc salt of an alkyl substituted xanthic acid. Examples of such zinc salts are: zinc dibutyl dithiocarbamate, zinc diethyl dithiocarbamate, zinc diamyl dithiocarbamate, zinc isopropyl xanthate and zinc amyl xanthate.

The secondary or enhancing accelerator comprises an alkali metal or ammonium salt of a dialkylated dithiocarbamic acid. Examples of such salts are the sodium, potassium, lithium and ammonium salts of the diethyl, diisopropyl, dibutyl or diamyl dithiocarbamic acid. The secondary accelerator may be augmented by an alkali metal or amine (cyclic or acyclic) salt of mercaptobenzothiazole. Examples of such salts are: the sodium, potassium, lithium, ethylamine, butylamine, ethylenediamine, cyclohexaylamine, aniline or methyl naphthylamine salts of mercaptobenzothiazole.

The amount of zinc oxide employed for the production of the solid fuel of this invention need not be large, a convenient proportion being about 5 parts by weight to 100 parts of the depolymerized rubber. Likewise, the proportion of elemental sulphur is usually small, being of the order of 1 to 5 parts by weight to 100 parts of the depolymerized rubber. The proportion of the primary and secondary accelerators may each vary from about 2 parts to 6 parts by weight for each 100 parts of the depolymerized rubber. When the secondary accelerator is augmented by an alkali metal or amine salt of mercaptobenzothiazole, the total quantity of the salt of the organic acid and the salt of mercaptobenzothiazole varies from the order of 2 parts to 6 parts by weight for each part of depolymerized rubber and the salt of the mercaptobenzothiazole is less than about 60% of the total secondary accelerator.

The proportion of alkali metal or ammonium perchlorate or nitrate may vary over a wide range. To secure substantially complete combustion, thereby converting substantially all the sulphur, carbon and hydrogen of the depolymerized rubber to sulphur dioxide, carbon dioxide and water, it is necessary to employ from about 5 to 8 parts of the perchlorate or nitrate for each 1 part of depolymerized rubber, the ratio varying with the particular oxidizing agent used. Markedly less oxidizing agent may be employed than the stoichiometrical quantity which is required for substantially complete combustion of the depolymerized rubber. Satisfactory solid fuel may be produced with ratios of as low as 2 parts by weight of the alkali metal or ammonium perchlorate or alkali metal ammonium nitrate to 1 part of the depolymerized rubber. Usually, increasing the ratio of oxidizing agent above the stoichiometrical quantity has no advantage since it is not utilized and results in a less coherent solid fuel. The utilization of such excess, however, may be desired for special purposes. Usually, a ratio of the order of 2 to 8 parts by weight of the oxidizing agent to 1 part by weight of the depolymerized rubber may be utilized in most solid fuels.

The combination of the primary and secondary accelerators in the processes of this invention not only reduces the time of curing, but the combination effects the curing at substantially room temperature or below without any substantial increase in temperature of the mass undergoing curing. Although the primary or secondary accelerators alone effect a curing of the depolymerized rubber, the proportion of accelerator and the time required are both too great for the feasible, desirable production of solid fuel by their utilization alone. For example, when 10 parts of the primary accelerator, the zinc salt of dibutyl dithiocarbamic acid, are added without any secondary accelerator to an admixture of 100 parts of depolymerized rubber, 5 parts of zinc oxide and 3 parts of sulphur, the cure required 4 days at room temperature. On the other hand, when 5 parts of the same primary accelerator was enhanced with 3 parts of the secondary accelerator, the sodium salt of dibutyl dithiocarbamic acid, and the combination added to an identically composed admixture of depolymerized rubber, zinc oxide and sulphur, the cure required only 16 hours at room temperature.

The processes for producing the crude rubber compositions which act as a binder for the oxidizing agent may be utilized for the production of other compositions in which the crude rubber acts as a binder for other materials. The practice of such processes would be the same as that herein described for the production of the solid fuel of this invention except that such other material would be employed instead of the oxidizing agent. The processes for incorporating other materials in a crude rubber binder would be especially advantageous when the material to be incorporated in the binder or the resulting composition would be affected by elevated temperatures of curing, or relatively quick curing at room temperature or below. For example, a caulking compound may be produced by utilizing the processes of this invention. Such caulking compound is prepared by incorporating a filler, such as clay or whiting, instead of the oxidizing agent. Such caulking compound can be applied at room temperature and cures at room temperature, in less than 24 hours.

A more comprehensive understanding of this invention is obtained by reference to the following examples:

*Example 1*

To 100 parts by weight of depolymerized rubber are added 5 parts by weight of zinc oxide and 3 parts by weight of sulphur. After the solids are uniformly distributed throughout the liquid depolymerized rubber, there are added successively 5 parts by weight of the zinc salt of dibutyl dithiocarbamic acid and 3 parts by weight of the sodium salt of dibutyl dithiocarbamic acid. After all of the solids are well distributed throughout the liquid depolymerized rubber, the mass is poured into a mold. Curing of the composition occurs in about 16 hours at room temperature (75° F.).

*Example 2*

There is prepared a liquid depolymerized rubber admixture identical in composition with that of Example 1 prior to molding the composition. To 100 parts by weight of this liquid admixture are added 300 parts by weight of potassium perchlorate. The potassium perchlorate is thoroughly mixed with the liquid mass. The mixture is then placed into a mold and cured in about 16 hours at room temperature (75° F.) to form a solid fuel.

As a test of the efficacy of the solid fuel, a portion of the liquid mass containing the liquid depolymerized rubber and the potassium perchlorate may be spread onto a long strip of paper which acts as a backing, and the whole may be exposed to the atmosphere. The composition placed on the paper backing becomes solid in about 16 hours. The composition of Example 2 burns very rapidly when ignited.

*Example 3*

Example 1 is repeated with the same primary accelerator, the zinc salt of dibutyl dithiocarbamic acid, but instead of the secondary accelerator employed in Example 1, there are added 3 parts by weight of a different secondary accelerator per 100 parts of depolymerized rubber. This secondary accelerator used in Example 3 consists of 2 parts by weight of the ammonium salt of diethyl dithiocarbamic acid and 1 part by weight of a water-soluble, dialkyl amine salt of mercaptobenzothiazole. Except for the different secondary accelerator, the procedure and composition of this example is the same as those of Example 1. The time of cure is about 16 hours at room temperature (75° F.).

*Example 4*

Example 3 is followed to produce a liquid depolymerized rubber prior to molding and curing. To 100 parts of the liquid admixture of depolymerized rubber of Example 3 are added 300 parts by weight of potassium perchlorate and the whole is thoroughly mixed. The mixture is permitted to cure at room temperature (75° F.) to produce a solid fuel in about 16 hours.

*Example 5*

To 100 parts by weight of depolymerized rubber are added 5 parts by weight of zinc oxide and 3 parts by weight of sulphur and the solids are uniformly distributed throughout the liquid. There are added and distributed throughout the liquid successively 5 parts by weight of zinc isopropyl xanthate and 3 parts by weight of the liquid sodium salt of dibutyl dithiocarbamic acid. The mass is then poured into a mold and permitted to cure at room temperature (75° F.) to form a solid mass of cured rubber.

*Example 6*

There is prepared a liquid depolymerized rubber admixture identical in composition with that of Example 5 prior to molding the composition. To 100 parts by weight of this liquid admixture are added 300 parts by weight of potassium perchlorate and the potassium perchlorate is thoroughly mixed with the liquid mass. The mixture is then placed into a mold and cures in about 16 hours at room temperature (75° F.) to form a solid fuel.

A nitrate, such as sodium nitrate, may be substituted for the potassium perchlorate in Examples 2, 4 and 6 to produce a solid fuel for rocket motors.

Various changes and modifications may be made in this invention without departing from the scope of the appended claims.

What is claimed is:

1. A solid fuel comprising cured depolymerized rubber and an alkali metal oxidizing agent, said solid fuel being produced by forming an admixture comprising 100 parts by weight of depolymerized rubber having a viscosity of 20,000 to 150,000 centipoises at 150° F., 2 to 6 parts by weight of a water-insoluble zinc salt of an acid, 2 to 6 parts by weight of a liquid salt of a dialkylated dithiocarbamic acid and 200 to 800 parts by weight of the alkali metal oxidizing agent, and curing the depolymerized rubber to a solid mass; said zinc salt of an acid being a zinc salt of an acid selected from the class consisting of alkylated dithiocarbamic acids, xanthic acid and alkyl substituted xanthic acids, said liquid salt of a dialkylated dithiocarbamic acid being selected from the class consisting of alkali metal and ammonium salts of dialkylated dithiocarbamic acids, and said alkali metal oxidizing agent being selected from the class consisting of alkali metal perchlorates, alkali metal nitrates, ammonium perchlorate and ammonium nitrate.

2. A solid fuel comprising cured depolymerized rubber and an alkali metal perchlorate, said solid fuel being produced by forming an admixture comprising 100 parts by weight of depolymerized rubber having a viscosity of 20,000 to 150,000 centipoises at 150° F., 2 to 6 parts by weight of a water-insoluble zinc salt of an acid, 2 to 6 parts by weight of a liquid salt of a dialkylated dithiocarbamic acid and 200 to 800 parts by weight of the alkali metal perchlorate, and curing the depolymerized rubber to a solid mass; said zinc salt of an acid being a zinc salt of an acid selected from the class consisting of alkylated dithiocarbamic acids, xanthic acid and alkyl substituted xanthic acids, and said liquid salt of a dialkylated dithiocarbamic acid being selected from the class consisting of alkali metal and ammonium salts of dialkylated dithiocarbamic acids.

3. A solid fuel comprising cured depolymerized rubber and an alkali metal nitrate, said solid fuel being produced by forming an admixture comprising 100 parts by weight of depolymerized rubber having a viscosity of 20,000 to 150,000 centipoises at 150° F., 2 to 6 parts by weight of a water-insoluble zinc salt of an acid, 2 to 6 parts by weight of a liquid salt of a dialkylated dithiocarbamic acid and 200 to 800 parts by weight of the alkali metal nitrate, and curing the depolymerized rubber to a solid mass; said zinc salt of an acid being a zinc salt of an acid selected from the class consisting of alkylated dithiocarbamic acids, xanthic acid and alkyl substituted xanthic acids, and said liquid salt of a dialkylated dithiocarbamic acid being selected from the class consisting of alkali metal and ammonium salts of dialkylated dithiocarbamic acids.

4. The process of producing a solid fuel which comprises forming an admixture comprising 100 parts by weight of depolymerized rubber, 2 to 6 parts by weight of a water-insoluble zinc salt of an acid, 2 to 6 parts by weight of a liquid salt of a dialkylated dithiocarbamic acid and 200 to 800 parts by weight of an alkali metal oxidizing agent, and curing the depolymerized rubber to a solid mass at not greater than substantially room temperature; said depolymerized rubber having a viscosity of 20,000 to 150,000 centiposes at 150° F., said zinc salt of an acid being a zinc salt of an acid selected from the class consisting of alkylated dithiocarbamic acids, xanthic acid and alkyl substituted xanthic acids, said liquid salt of a dialkylated dithiocarbamic acid being selected from the class consisting of alkali metal and ammonium salts of dialkylated dithiocarbamic acids, and said alkali metal oxidizing agent being selected from the class consisting of alkali metal perchlorates, alkali metal nitrates, ammonium perchlorate and ammonium nitrate.

5. The process of producing a solid fuel which comprises forming an admixture comprising 100 parts by weight of depolymerized rubber, 2 to 6 parts by weight of a water-insoluble zinc salt of a dialkylated dithiocarbamic acid, 2 to 6 parts by weight of a liquid salt of a dialkylated dithiocarbamic acid and 200 to 800 parts by weight of an alkali metal perchlorate, and curing the depolymerized rubber to a solid mass at not greater than substantially room temperature; said depolymerized rubber having a viscosity of 20,000 to 150,000 centipoises at 150° F., and said liquid salt of a dialkylated dithiocarbamic acid being selected from the class consisting of alkali metal and ammonium salts of dialkylated dithiocarbamic acids.

6. The process of producing a solid fuel which comprises forming an admixture comprising 100 parts by weight of depolymerized rubber, 2 to 6 parts by weight of a water-insoluble zinc salt of a dialkylated dithiocarbamic acid, 2 to 6 parts by weight of a liquid salt of a dialkylated dithiocarbamic acid and 200 to 800 parts by weight of an alkali metal nitrate, and curing the depolymerized rubber to a solid mass at not greater than substantially room temperature; said depolymerized rubber having a viscosity of 20,000 to 150,000 centipoises at 150° F., and said liquid salt of a dialkylated dithiocarbamic acid being selected from the class consisting of alkali metal and ammonium salts of dialkylated dithiocarbamic acids.

7. The process of producing a solid fuel which comprises forming an admixture comprising 100 parts by weight of depolymerized rubber, 2 to 6 parts by weight of a water-insoluble zinc salt of an alkyl substituted xanthic acid, 2 to 6 parts by weight of a liquid salt of a dialkylated dithiocarbamic acid and 200 to 800 parts by weight of an alkali metal perchlorate, and curing the depolymerized rubber to a solid mass at not greater than substantially room temperature; said depolymerized rubber having a viscosity of 20,000 to 150,000 centipoises at 150° F., and said liquid salt of a dialkylated dithiocarbamic acid being selected from the class consisting of alkali metal and ammonium salts of dialkylated dithiocarbamic acids.

8. The process of producing a solid fuel which comprises forming an admixture comprising 100 parts by weight of depolymerized rubber, 2 to 6 parts by weight of a water-insoluble zinc salt of an alkyl substituted xanthic acid, 2 to 6 parts by weight of a liquid salt of a dialkylated dithiocarbamate and 200 to 800 parts by weight of an alkali metal nitrate, and curing the depolymerized rubber to a solid mass at not greater than substantially room temperature; said depolymerized rubber having a viscosity of 20,000 to 150,000 centipoises at 150° F. and said liquid salt of a dialkylated dithiocarbamic acid being selected from the class consisting of alkali metal and ammonium salts of dialkylated dithiocarbamic acids.

9. The process of producing a solid fuel which comprises forming an admixture comprising 100 parts by weight of depolymerized rubber, 2 to 6 parts by weight of a water-insoluble zinc salt of a dialkylated dithiocarbamic acid, a liquid salt of a dialkylated dithiocarbamic acid, an alkali metal salt of mercaptobenzothiazole and 200 to 800 parts by weight of an alkali metal perchlorate, and curing the depolymerized rubber to a solid mass at not greater than substantially room temperature; said depolymerized rubber having a viscosity of 20,000 to 150,000 centipoises at 150° F., said liquid salt of a dialkylated dithiocarbamic acid being selected from the class consisting of alkali metal and ammonium salts of dialkylated dithiocarbamic acids, the total quantity of said liquid salt and said alkali metal salt of mercaptobenzothiazole being 2 to 6 parts by weight and the amount of said alkali metal salt of mercaptobenzothiazole being less than 60% of said total quantity.

10. The process of producing a solid fuel which comprises forming an admixture comprising 100 parts by weight of depolymerized rubber, 2 to 6 parts by weight of a water-insoluble zinc salt of a dialkylated dithiocarbamic acid, a liquid salt of a dialkylated dithiocarbamic acid, an alkali metal salt of mercaptobenzothiazole and 200 to 800 parts by weight of an alkali metal nitrate and curing the depolymerized rubber to a solid mass at not greater than substantially room temperature; said depolymerized rubber having a viscosity of 20,000 to 150,000 centipoises at 150° F., said liquid salt of a dialkylated dithiocarbamic acid being selected from the class consisting of alkali metal and ammonium salts of dialkylated dithiocarbamic acids, the total quantity of said liquid salt and said alkali metal salt of mercaptobenzothiazole being 2 to 6 parts by weight and the amount of said alkali metal salt of mercaptobenzothiazole being less than 60% of said total quantity.

11. The process of producing a solid fuel which comprises forming an admixture comprising 100 parts of liquid depolymerized rubber, about 5 parts of the zinc salt of dibutyl dithiocarbamic acid, about 3 parts of the sodium salt of dibutyl dithiocarbamic acid, and about 300 parts of potassium perchlorate, and curing the depolymerized rubber to a solid mass at not greater than substantially room temperature, said depolymerized rubber having a viscosity of 20,000 to 150,000 centipoises at 150° F.

12. The process of producing a solid fuel which comprises forming an admixture comprising 100 parts of liquid depolymerized rubber, about 5 parts of the zinc salt of dibutyl dithiocarbamic acid, about 2 parts of the ammonium salt of dibutyl dithiocarbamate, about 1 part of a dialkyl amine salt of mercaptobenzothiazole, and about 300 parts of potassium perchlorate, curing the depolymerized rubber to a solid mass at not greater than substantially room temperature, said depolymerized rubber having a viscosity of 20,000 to 150,000 centipoises at 150° F.

13. The process of producing a solid fuel which comprises forming an admixture comprising 100 parts of liquid depolymerized rubber, about 5 parts of zinc isopropyl xanthate, about 3 parts of the sodium dibutyl dithiocarbamic acid, and about 300 parts of potassium perchlorate, and curing the depolymerized rubber to a solid mass at not greater than substantially room temperature, said depolymerized rubber having a viscosity of 20,000 to 150,000 centipoises at 150° F.

14. The process of producing a solid fuel which comprises forming an admixture comprising 100 parts by weight of depolymerized rubber, 2 to 6 parts by weight of a water-insoluble zinc salt of an acid, a liquid salt of a dialkylated dithiocarbamic acid, an alkali metal salt of mercaptobenzothiazole and 200 to 800 parts by weight of an alkali metal oxidizing agent, and curing the depolymerized rubber to a solid mass at not greater than substantially room temperature; said depolymerized rubber having a viscosity of 20,000 to 150,000 centipoises at 150° F., said zinc salt of an acid being a zinc salt of an acid selected from the class consisting of alkylated dithiocarbamic acids, xanthic acid and alkyl substituted xanthic acids, said liquid salt of dialkylated dithiocarbamic acid being selected from the class consisting of alkali metal and ammonium salts of dialkylated dithiocarbamic acids, said alkali metal oxidizing agent being selected from the class consisting of alkali metal perchlorates and alkali metal nitrates, ammonium perchlorate, ammonium nitrate, the total quantity of said liquid salt and said alkali metal salt of mercaptobenzothiazole being 2 to 6 parts by weight and the amount of said alkali metal salt of mercaptobenzothiazole being less than 60% of said total quantity.

15. The process of producing a solid fuel which comprises forming an admixture comprising 100 parts by weight of depolymerized rubber, 2 to 6 parts by weight of a water-insoluble zinc salt of an acid, a liquid salt of a dialkylated dithiocarbamic acid, an amine salt of mercaptobenzothiazole and 200 to 800 parts by weight of an alkali metal oxidizing agent, and curing the depolymerized rubber to a solid mass at not greater than room temperature; said depolymerized rubber having a viscosity of 20,000 to 150,000 centipoises at 150° F., said zinc salt of an acid being a zinc salt of an acid selected from the class consisting of alkylated dithiocarbamic acids, xanthic acid, and alkyl substituted xanthic acids, said liquid salt of a dialkylated dithiocarbamic acid being selected from the class consisting of alkali metal and ammonium salts of dialkylated dithiocarbamic acids, said alkali metal oxidizing agent being selected from the class consisting of alkali metal perchlorates, alkali metal nitrates, ammonium perchlorate and ammonium nitrate, the total quantity of said liquid salt and said amine salt of mercaptobenzothiazole being 2 to 6 parts by weight and the amount of said amine salt of mercaptobenzothiazole being less than 60% of said total quantity.

16. The process of producing a solid fuel which comprises forming an admixture comprising 100 parts by weight of depolymerized rubber, 2 to 6 parts by weight of a water-insoluble zinc salt of an acid, 2 to 6 parts by weight of a liquid salt of a dialkylated dithiocarbamic acid and 500 to 800 parts by weight of an alkali metal oxidizing agent, and curing the depolymerized rubber to a solid mass at not greater than substantially room temperature; said depolymerized rubber having a viscosity of 20,000 to 150,000 centipoises at 150° F., said zinc salt of an acid being a zinc salt of an acid selected from the class consisting of alkylated dithiocarbamic acids, xanthic acid and alkyl substituted xanthic acids, said liquid salt of a dialkylated dithiocarbamic acid being selected from the class consisting of alkali metal and ammonium salts of dialkylated dithiocarbamic acids, and said alkali metal oxidizing agent being selected from the class consisting of alkali metal perchlorates, alkali metal nitrates, ammonium perchlorate and ammonium nitrate.

17. The process of producing a solid fuel in accordance with claim 4, in which the curing is effected in about 16 hours.

18. The process of producing a solid fuel in accordance with claim 9, in which the curing is effected in about 16 hours.

19. The process of producing a solid fuel in accordance with claim 10, in which the curing is effected in about 16 hours.

References Cited in the file of this patent
UNITED STATES PATENTS

| | | |
|---|---|---|
| 2,211,632 | Watt | Aug. 13, 1940 |
| 2,205,100 | Lichty | June 18, 1940 |
| 2,622,277 | Bonell et al. | Dec. 23, 1952 |
| 2,766,269 | Pleuss | Jan. 1, 1957 |
| 2,783,138 | Parsons | Feb. 26, 1957 |
| 2,791,883 | Moore et al. | May 14, 1957 |
| 2,857,258 | Thomas | Oct. 21, 1958 |
| 2,877,504 | Fox | Mar. 17, 1959 |

OTHER REFERENCES

Arendale: Industrial and Engineering Chem., vol. 48, No. 4, April 1956, pp. 725–6.

Zaehringer: Chem. Engineering Progress, vol. 51, No. 7, July 1955, p. 302.

Chem. and Eng. News, October 7, 1957, pp. 62–3.

UNITED STATES PATENT OFFICE
CERTIFICATE OF CORRECTION

Patent No. 2,953,446            September 20, 1960

Thomas Joseph Engelbach

It is hereby certified that error appears in the printed specification of the above numbered patent requiring correction and that the said Letters Patent should read as corrected below.

Column 1, line 16, for "reducing" read -- producing --; column 2, line 43, after "metal" insert -- or --.

Signed and sealed this 11th day of April 1961.

(SEAL)
Attest:
ERNEST W. SWIDER            ARTHUR W. CROCKER
Attesting Officer            Acting Commissioner of Patents